United States Patent Office 3,013,546
Patented Dec. 19, 1961

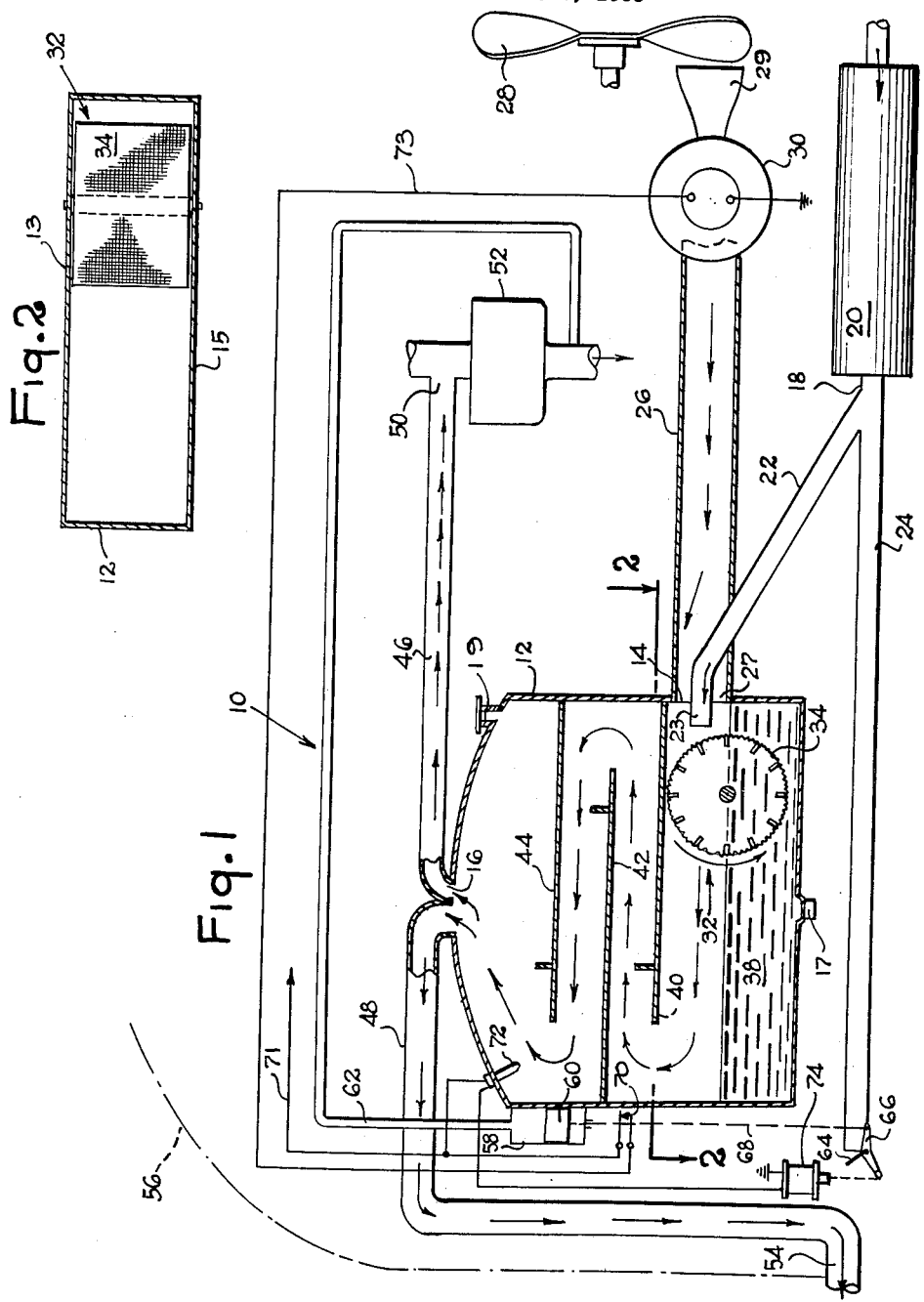

3,013,546
EXHAUST TREATMENT DEVICE
Lester Bonifield, 115 N. Colorado Ave., Colorado Springs, Colo., assignor of twenty percent to Wilfred G. Perkins and twenty percent to George R. Perkins, both of Colorado Springs, Colo.
Filed June 8, 1959, Ser. No. 818,602
16 Claims. (Cl. 123—119)

This invention relates to an engine exhaust treating apparatus and more particularly to an apparatus for eliminating a major quantity of the noxious smog producing and irritating substances from the exhaust of internal combustion engines.

The exhaust from the increased number of automobiles and other internal combustion engines currently in use, when combined with particular atmospheric conditions, causes many thickly populated areas to be plagued with quantities of noxious and irritating gases, fumes, and the like. Consequently it has become urgently necessary to diminish pollution of the atmosphere not only to eliminate the obvious health hazards but to decrease other damage and discomforts which result.

There have been many attempts to solve the pollution problem by using engine exhaust treating devices such as filters, liquid tanks, or catalytic agents which convert the irritating substances to a harmless product. Although some of these devices were effective in reducing a certain amount of the irritating substances in the exhaust, commercial practice has not been adopted for various reasons based upon cost, effectiveness or application.

In addition, prior engine exhaust treating devices did not take into consideration the fact that the percentage of noxious and irritating substances in the engine exhaust is a function of engine speed and that, in general, this percentage is greatest when the engine is idling and lower while the engine is operating at higher speeds. Thus an important concept of this invention resides in a means embodied in a new and improved exhaust treating system whereby a greater percentage of the engine exhaust is treated while at low or idling speeds and a lower percentage at high engine speeds.

In prior exhaust treating devices, when the exhaust gases were forced through conventional filters, the filters tended to clog and this substantially increased the back pressure of the engine, sharply to reduce its efficiency. Thus another important concept of this invention is to make use of a means which is not subject to filter clogging and thus does not operate to increase the engine back pressure, but which efficiently filters out the noxious smog producing and irritating substances from the engine exhaust.

An important object of this invention is to devise an engine exhaust treating apparatus which incorporates the above described desirable features and it is a related object to produce a device of the type described which operates in response to engine speed for treatment of exhaust; which is free of interferences in operation due to clogging; which operates to treat the exhaust for increase in humidity of air feed for combustion in the engine, and which operates more efficiently in the treatment of exhaust to remove undesirable components with corresponding reduction of components generating smog conditions.

These and other objects of this invention will become more apparent when read in the light of the accompanying drawing and specification wherein—

FIG. 1 is an elevational view of the engine exhaust treating apparatus, and

FIG. 2 is a sectional view taken on the line 2—2 of FIG. 1.

Referring now to FIG. 1 of the drawing, the engine exhaust treating apparatus indicated generally by the reference numeral 10 is in this particular embodiment associated with an internal combustion engine mounted in an automotive vehicle. This apparatus comprises a housing 12. The housing is provided with an inlet opening 14 and an outlet opening 16. The engine exhaust pipe 18, shown projecting from muffler 20, divides into branches 22 and 24. Branch 22 may be formed of flexible tubing for absorbing shock and vibration and, as shown, terminates in an end portion 23 positioned in inlet opening 14. Branch 24 forms a tail pipe as described below. An additional pipe 26 is connected at end 27 to the housing inlet 14 while its opposite end 29 is open to the ambient air just behind the engine cooling fan 28. With this arrangement, operation of the engine (not shown) rotates fan 28 and forces a stream of air through pipe 26 and housing 12. In this particular embodiment tube 22 extends through an opening in pipe 26 and its end portion 23 is positioned by any conventional means (not shown) in the central part of pipe 26. With this arrangement, movement of the air through pipe 26 and through housing 12 carries the engine exhaust from pipe 22 along with it.

An electric fan 30 is mounted in pipe 26, in this particular embodiment, and as described below is designed to maintain a predetermined flow of air through pipe 26, even if the engine is operating at idling speeds.

A cylindrical wheel indicated generally by the reference numeral 32 is rotatably mounted on a horizontal axis in housing 12 by any conventional means. This wheel has a perforate cylindrical surface 34 which is preferably formed of a mesh screen for reasons to become apparent below. The housing 12 is partially filled with about 2½ gallons of an aqueous solution 38 and the wheel 32 is mounted so a portion of the cylindrical surface 34 is submerged in this solution.

A series of horizontally mounted baffles 40, 42 and 44 are positioned inside the housing as shown to provide a long path through the housing 12 for the flow of the mixture of engine exhaust and air. As seen, baffle 40 is mounted in close proximity to the upper surface of the wheel and the sides 13 and 15 of housing 12 are closely adjacent to the sides of wheel 32 (see FIG. 2) so that the cylindrical surface 34 of the wheel 32 forms an obstacle to the flow of air and engine exhaust through the housing. In addition to forming an obstacle to the flow of air and engine exhaust, surface 34 is close to inlet opening 14. Consequently the force of the stream of air and engine exhaust from pipes 22 and 26 directed against surface 34 causes wheel 32 to rotate (see FIG. 1).

The outlet 16 of housing 12 communicates with the ends of pipes 46 and 48. The end 50 of pipe 46 is connected to an input to the carburetor 52 of the engine while end 54 of pipe 48 communicates with the ambient air. As stated above, the internal combustion engine and the engine exhaust treating apparatus are part of an automotive vehicle 56, a portion of which is shown in dotted lines in FIG. 1, and for reasons to become apparent below, end 54 of pipe 48 communicates with the ambient air at the rear of the vehicle where a low atmospheric pressure will develop when the vehicle is moving forwardly.

The engine exhaust treating apparatus includes a vacuum cylinder 58 rigidly mounted on the vehicle. A piston 60 is movably mounted in this cylinder in a manner well known in the art. This cylinder is directly connected to the engine intake manifold (not shown) by means of tube 62 so that increased engine speed and the accompanying increased vacuum in the intake manifold causes the piston to rise, in the particular embodiment shown.

A damper 64 is pivotally mounted in the end of tail pipe 24 by any conventional means and is movable between a tail pipe open position and a tail pipe closed position. A two armed lever 66 is connected to an end of damper 64. One arm of this lever is connected to piston 60 by a suitable linkage 68 in such a way that increased engine speed causes piston 60 to rise and thereby pivot the damper toward a tail pipe open position, while low engine speeds cause the piston to move in the opposite direction and thereby pivot the damper 64 to a tail pipe closed position.

An electric switch 70 is connected to the piston 60 and linkage 68 in such a way that the switch closes when the engine is operating at idling conditions and opens when the engine speeds up. This switch is connected to a battery (not shown) by a wire 71 and to the electric fan 30 by another wire 73, so that the electric fan 30 operates when the engine speed is low and automatically cuts out when the engine speeds up.

A thermoswitch 72 is mounted at some suitable spot on the apparatus. This thermoswitch is connected both to wire 71 and to solenoid 74 and when closed, energizes the solenoid. The solenoid is adjustably connected by any conventional linkage means to an arm of lever 66 in such a way that when energized, it overrides the vacuum cylinder and moves the damper 64 to a tail pipe open position. Consequently the thermoswitch 72 and solenoid 74 act as a safety device to reduce the flow of hot engine exhaust in housing 12 in the event the temperature in the housing becomes dangerously hot.

In operation, at idling engine speeds, the electric fan 30 is operating and damper 64 is in the tail pipe closed position as described above. This causes substantially all the engine exhaust to flow through the housing 12, and the operation of the electric fan 30 supplements the air flow from the engine cooling fan 28 to maintain a sufficient air-flow in pipe 26 to keep the wheel 32 rotating and the exhaust treating apparatus operating.

The rotation of wheel 32 with its lower portion submerged in an aqueous solution 38 wets the screen 34 and causes a thin film of the liquid to form on it. As stated above, the cylindrical surface 34 of wheel 32 obstructs the passage of the mixture of air and engine exhaust through the housing with the thin film on the surface of screen 34 forming an almost continuous barrier so that substantially all the engine exhaust entering housing 12 must pass through the moistened screen. In so doing, a large percentage of undesirable substances are removed from the exhaust. In particular, when the aqueous solution is composed of 2 ounces of a soap-like compound mixed in a half gallon of ethylene glycol and two gallons of water, reductions of more than 70 percent of the objectional impurities have been measured.

The mixture of the engine exhaust with air from pipe 26 cools the engine exhaust and the passage of the engine exhaust and air through the film on the wheel, in addition to removing a large percentage of undesirable substances from the exhaust, adds moisture to the mixture and further cools it. Finally, the passage of the mixture of moistened air and purified engine exhaust through the long path defined by baffles 40, 42 and 44 in the housing further cools the engine exhaust and air mixture until it reaches the housing outlet 16.

With this arrangement, the moistened surface of the wheel and the liquid film formed thereon functions as a self-renewing filter and the undesirable particles removed from the engine exhaust and deposited on the screen 34 are transferred to the main body of the liquid 38 by the rotation of the wheel while a fresh film of the liquid is continuously being deposited on the screen. Consequently the self-renewing filter formed by wheel 32 and the liquid 38 never clogs and because of the thinness of the film of liquid or the moistened mesh screen, the resistance to the passage of the air and the engine exhaust through the cylindrical surface of the wheel is low so that the back pressure on the engine is not substantially increased. Periodically, the liquid in the housing may be removed and replaced through the drain and filler plugs 17 and 19. If desired, the speed of rotation of the wheel could be increased by forming vanes on the cylindrical surface 34 and it is also contemplated that certain circumstances may make it desirable to drive the wheel 32 by means of an electric motor.

As the speed of the engine increases, the vacuum in the intake manifold also increases which causes piston 60 in the vacuum cylinder 58 to rise. Consequently damper 64 is moved to a tail pipe open position. At the same time switch 70 opens, shutting down electric fan 30, but the loss of the help of fan 30 in moving air through pipe 26 is compensated for by the increased speed of the engine cooling fan 28.

As stated above, end 54 of pipe 48 terminates at the rear of the automotive vehicle 56 where the movement of the vehicle forwardly causes a region of low atmospheric pressure to develop. This causes a large pressure differential between the mouth 29 of pipe 26 and the exit 54 of pipe 48. This arrangement has three important advantages. First of all, it reduces the back pressure of the engine exhaust thereby increasing engine efficiency; secondly, the increased rotational speed of fan 28 in cooperation with the low atmospheric pressure at the exit 54 of pipe 48 eliminates the need for auxiliary fans and extra power to push the exhaust through the housing; and thirdly, it supplies enough pressure to force moistened air through pipe 46 to carburetor 52 to provide increased moisture in the feed to the engine carburetor.

The movement of damper 64 to a tail pipe open position permits up to 50 percent of the engine exhaust to leave the tail pipe untreated, in this particular embodiment, but because lower quantities of irritating substances are produced in the engine exhaust at higher engine speeds, this causes no difficulty.

It is also contemplated that the damper 64 could be mounted at the junction of pipes 22 and 24 in such a way that at high engine speeds all of the engine exhaust is diverted out of the tail pipe and only fresh air from pipe 26 flows through the housing 12. The advantage of this arrangement lies in the fact that the connection of pipe 46 to the carburetor 52 gives this apparatus the added function of providing water injection to the engine, as described above. Consequently, if at high speeds only moistened air flows in pipe 46 to carburetor 52, the engine will receive more oxygen, when it is most needed. On the other hand, at idling engine speeds the consumption of oxygen by the engine is substantially lower so that the presence of engine exhaust in pipe 46 is not objectionable.

The invention may be embodied in other forms without departing from the spirit or essential characteristics thereof as set forth in the claims, and the present embodiment is therefore to be considered as illustrative and not restrictive and it is intended to include all changes which come within the scope and range of the claims.

I claim:

1. An engine exhaust treating apparatus for an internal combustion engine comprising a housing, an inlet to said housing, said housing inlet connected to an engine exhaust pipe, means for forcing at least a portion of the engine exhaust through the housing, and a self-renewing filter mounted in said housing and forming a substantially continuous barrier in the path of the engine exhaust moving through the housing, said self-renewing filter operating to remove undesirable substances from the engine exhaust, cooling it, and adding moisture thereto and means controlled by the engine speed for regulating the percentage of the engine exhaust forced through the housing.

2. The apparatus described in claim 1 wherein said housing is partially filled with a liquid and said self-renewing filter comprises a cylindrical wheel rotatably mounted in said housing, the cylindrical surface of said wheel perforate and mounted so a portion is partly submerged in the liquid, means causing said cylindrical wheel to rotate whereby a liquid is deposited on the cylindrical surface of the the wheel in the path of the engine exhaust so that the engine exhaust is forced through said liquid.

3. An engine exhaust treating apparatus for an internal combustion engine comprising a housing partially filled with a liquid, an inlet to said housing, said housing inlet connected to an engine exhaust pipe, means for forcing at least a portion of the engine exhaust through the housing, a cylindrical wheel rotatably mounted in said housing, the cylindrical surface of said wheel forming a substantially continuous barrier in the path of the engine exhaust moving through the housing, said cylindrical surface perforate and positioned so a portion thereof is partially submerged in the housing, means causing said cylindrical wheel to rotate whereby a liquid is deposited on the cylindrical surface of the wheel so that when the engine exhaust is forced through said liquid, the cylindrical surface of said wheel functions as a self-renewing filter operating to remove undesirable substances from the engine exhaust, cooling it, and adding moisture thereto, said means causing said cylindrical wheel to rotate comprising a pipe, one end of said pipe connected to said inlet to said housing and the other end communicating with the ambient air behind the cooling fan of the internal combustion engine whereby operation of the engine at a high speed causes said cooling fan to force a stream of air through said pipe against the periphery of said wheel with enough force to cause the wheel to rotate, and an electric fan mounted in said pipe, a switch connected to said fan, means connected to said switch and controlled by the speed of the motor to close said switch and start said fan when the speed of the engine drops below a predetermined value whereby a sufficient air flow will be directed against the periphery of said wheel to cause it to rotate even when said engine is operating at idling speeds.

4. The apparatus described in claim 1 wherein an inlet to said housing communicates with the ambient air, means forcing a quantity of air through said housing along with said engine exhaust, said housing having a least one outlet, said outlet connected to the carburetor of the internal combustion engine whereby a cooled and moistened mixture of air and purified engine exhaust moving through the housing is directed back to said carburetor for feed to the engine.

5. The apparatus described in claim 4 wherein said means forcing a quantity of air through said housing comprises a pipe, one end of said pipe connected to said inlet to said housing and the other end of said pipe communicating with the ambient air behind the cooling fan of the combustion engine whereby operation of the engine at a sufficiently high speed forces a stream of air through said housing carrying the engine exhaust therealong independently of auxiliary air moving mechanisms.

6. The apparatus described in claim 1 wherein said means controlled by said engine speed operates to cause said apparatus to treat substantially all the engine exhaust at idling engine speeds and a decreased percentage of the engine exhaust at increased engine speeds.

7. An engine exhaust treating apparatus for an internal combustion engine comprising a housing having an inlet, an engine exhaust pipe divided into two branches, one branch connected to the inlet to the housing, the other branch connected to a tail pipe, means for forcing at least a portion of the engine exhaust through the housing, said means including, a damper in said tail pipe movable between a pipe open and a pipe closed position, a vacuum cylinder in fixed relation to said engine and connected to its manifold intake, a piston movably mounted in said cylinder and connected through linkage to said damper in such a way that when the manifold intake vacuum drops due to decreased engine speed, the piston in said vacuum cylinder moves to cause the damper in the tail pipe to move toward the pipe closed position and at high engine speeds the increased vacuum in the intake manifold causes the piston to move the damper toward a pipe open position, so that at low engine speeds substantially all the engine exhaust moves through the housing while at higher engine speeds a decreased percentage of the engine exhaust moves through said housing and a self-renewing filter mounted in said housing and forming a substantially continuous barrier in the path of the engine exhaust moving through the housing, said self-renewing filter operating to remove undesirable substances from the engine exhaust, and cool it, and add moisture thereto.

8. The apparatus described in claim 7 including temperature controlled means connected to said damper for overriding said vacuum cylinder and moving said damper to a pipe open position when the temperature in said housing exceeds a predetermined value.

9. The apparatus described in claim 1 including a pipe, one end of said pipe connected to the inlet in said housing, the other end of said pipe positioned behind the cooling fan of the engine whereby operation of the engine at sufficiently high speed forces a stream of air through said housing carrying the engine exhaust therealong independently of auxiliary air moving mechanisms.

10. An engine exhaust treating apparatus for an internal combustion engine comprising a housing, an inlet to said housing, an engine exhaust pipe, said housing inlet connected to said engine exhaust pipe, means for forcing at least a portion of the engine exhaust through said housing, said means including a pipe, one end of said pipe connected to the inlet in said housing, the other end of said pipe positioned behind the cooling fan of the engine whereby operation of the engine at sufficiently high speed forces a stream of air through said housing carrying the engine exhaust therealong, an electric fan mounted in said pipe, a switch connected to said fan, means connected to said switch and controlled by the speed of the engine to close said switch and start said fan when the speed of the engine drops below a predetermined value whereby a sufficient air flow will pass through the housing regardless of the engine speed and a self-renewing filter mounted in said housing and forming a substantially continuous barrier in the path of the engine exhaust moving through the housing, said self-renewing filter operating to remove undesirable substances from the engine exhaust, cooling it, and adding moisture thereto.

11. The apparatus described in claim 10 wherein said means connected to said control switch and operated by the speed of the engine additionally controls the apparatus and causes it to treat substantially all the engine exhaust at idling engine speeds and a decreased percentage of the exhaust at increased engine speeds.

12. A combined engine exhaust treating apparatus and a water injection system for an internal combustion engine comprising a housing, at least one inlet to said housing connected to the engine exhaust and to the ambient air, an aqueous solution in said housing, means for forcing at least a portion of said engine exhaust and a stream of ambient air through said aqueous solution to remove undesirable substances from the engine exhaust, to cool it, and to add moisture to the mixture of air and purified engine exhaust, said housing having at least one outlet, means connecting said outlet both to the ambient air and to the carburetor of the internal combustion engine so at least a portion of the moistened mixture of air and purified engine exhaust in said housing is directed back to the carburetor of the engine.

13. An engine exhaust treating apparatus for an internal combustion engine comprising a housing, engine exhaust purifying means in said housing, said housing having an inlet opening and an outlet opening, the exhaust pipe of said engine dividing into two branches, one branch connected to the inlet of said housing, the other branch connected to the tail pipe of the engine, a damper in said tail pipe movable between a pipe open and a pipe closed position, means responsive to engine speed and connected to said damper to automatically move it to a pipe closed position when the engine is operating at idling speeds and a pipe open position when the engine is operating at higher speeds whereby at idling engine speeds substantially all the engine exhaust is directed through said housing to be purified while at higher engine speeds only a portion of the engine exhaust is purified.

14. The apparatus described in claim 13 including temperature controlled means connected to said damper for overriding said engine speed responsive means and moving said damper to a pipe opening position when the temperature in said housing exceeds a predetermined value.

15. An apparatus for preventing smog producing and irritating engine exhaust products from being discharged into the atmosphere comprising a housing, an inlet to said housing, said housing inlet adapted to be connected to an engine exhaust and exposed to the ambient air whereby the hot engine exhaust moving through the housing is mixed with and cooled by the ambient air, an electric fan mounted on said apparatus to force the mixture of engine exhaust and air through said housing, a self-renewing filter mounted in said housing and forming a substantially continuous barrier in the path of the mixture of engine exhaust and air moving therethrough, said self-renewing filter operating to cool and remove the smog producing and irritating engine exhaust products from the exhaust gases without causing an objectionable increase in engine back pressure.

16. The apparatus described in claim 15 wherein said housing is partially filled with a liquid and said self-renewing filter comprises a cylindrical wheel rotatably mounted in said housing, the cylindrical surface of said wheel perforate and mounted so a portion is partly submerged in the liquid, means causing said cylindrical wheel to rotate whereby a liquid is deposited on the cylindrical surface of the wheel in the path of the engine exhaust so that the engine exhaust is forced through said liquid.

References Cited in the file of this patent

UNITED STATES PATENTS

| | | |
|---|---|---|
| 1,296,115 | Pfeifer | Mar. 4, 1919 |
| 1,766,673 | Moore | June 24, 1930 |
| 1,843,999 | White | Feb. 9, 1932 |
| 1,856,005 | Tomshow | Apr. 26, 1932 |
| 1,953,537 | Miller et al. | Apr. 3, 1934 |